United States Patent [19]
DeLong

[11] Patent Number: 5,140,732
[45] Date of Patent: Aug. 25, 1992

[54] METHOD OF FORMING BUSHING PLATE FOR GLASS FILAMENTS

[75] Inventor: Mark P. DeLong, Sylvania, Ohio

[73] Assignee: Manville Corporation, Denver, Colo.

[21] Appl. No.: 714,693

[22] Filed: Jun. 13, 1991

[51] Int. Cl.[5] ............................................. C03B 37/08
[52] U.S. Cl. ................................. 29/163.6; 65/1; 65/2; 76/107.6
[58] Field of Search ............ 65/1, 2; 29/163.6, 421.1; 76/4, 107.6

[56] References Cited

U.S. PATENT DOCUMENTS

| | | |
|---|---|---|
| 1,796,571 | 3/1931 | Mathieu . |
| 2,267,019 | 12/1941 | Esser . |
| 2,489,508 | 11/1949 | Stalego . |
| 2,996,758 | 8/1961 | McFadden . |
| 3,164,457 | 1/1965 | Mitchell et al. .................... 65/1 |
| 3,241,928 | 3/1966 | Pease . |
| 3,488,172 | 1/1970 | Aliotta ................................ 65/1 |
| 3,511,916 | 5/1970 | Sinclair et al. ................. 65/1 X |
| 3,514,841 | 2/1970 | Woodward et al. ............ 65/1 X |
| 3,552,952 | 1/1971 | Shaw ............................... 65/1 X |
| 3,574,581 | 4/1971 | Strickland et al. ................. 65/1 |
| 3,779,728 | 12/1973 | Hansen et al. ..................... 65/1 |
| 3,837,823 | 9/1974 | Shealy ................................ 65/1 |
| 3,980,473 | 9/1976 | Costin ............................. 65/1 X |
| 4,043,778 | 8/1977 | Harris ................................. 65/1 |
| 4,099,948 | 7/1978 | Thomas .............................. 65/1 |
| 4,140,507 | 2/1979 | Costin et al. ....................... 65/2 |
| 4,146,373 | 3/1979 | Sullivan et al. .................... 65/1 |
| 4,155,731 | 5/1979 | Byrnes et al. ...................... 65/1 |
| 4,274,852 | 6/1981 | McGarry ............................ 65/2 |
| 4,292,862 | 10/1981 | Thompson .......................... 76/4 |
| 4,330,311 | 5/1982 | Jensen ................................. 65/1 |
| 4,331,656 | 9/1982 | Jensen ................................. 65/1 |
| 4,338,110 | 7/1982 | Babbitt ................................ 65/1 |
| 4,518,406 | 12/1985 | Perkins et al. ..................... 65/1 |
| 4,525,188 | 6/1985 | Jensen ................................. 65/1 |
| 4,525,433 | 6/1985 | Heywood ........................ 65/1 X |
| 4,536,202 | 8/1985 | Perkins et al. ..................... 65/1 |
| 4,565,559 | 1/1986 | Perkins ............................... 65/2 |
| 4,566,888 | 1/1986 | Schaefer ............................. 65/1 |
| 4,591,371 | 5/1986 | Schaefer ............................. 65/1 |
| 4,673,427 | 6/1987 | Van Der Giessen et al. ..... 65/2 |
| 4,698,082 | 10/1987 | Jensen ................................. 65/1 |
| 4,704,150 | 11/1987 | McEarthron ....................... 65/1 |
| 4,717,411 | 1/1988 | Fowler ................................ 65/1 |
| 4,738,700 | 4/1988 | Grundy ............................... 65/1 |
| 4,746,344 | 5/1988 | Kuhn et al. ........................ 65/1 |
| 4,846,865 | 7/1989 | Hinze ................................. 65/1 |
| 4,941,903 | 7/1990 | Jensen ................................ 65/1 |
| 4,957,525 | 9/1990 | Gaertner et al. ................... 65/1 |

FOREIGN PATENT DOCUMENTS

| | | | |
|---|---|---|---|
| 48-3857 | 2/1973 | Japan ............................... 65/1 |
| 61-261230 | 11/1986 | Japan ............................... 65/1 |

OTHER PUBLICATIONS

The Manufacturing Technology of Continuous Glass Fibers, by L. Lowenstein, published by Elsevier Science Publishing Company, Inc., New York, 1980, pp. 131-135.

Primary Examiner—Robert L. Lindsay
Attorney, Agent, or Firm—Cornelius P. Quinn

[57] ABSTRACT

A bushing plate for use in the production of glass fibers has an array of nozzle tips. The bushing plate is formed by successive cold forming operations from a starting plate of precious metal alloy. The starting plate is first indexed through a press which coins embossments raised from one side of the plate. The plate is then indexed through another press in which bores are extruded through the embossments to form the nozzle tips. The ends of the tips are then finished in an operation such as EDM wire finishing.

5 Claims, 4 Drawing Sheets

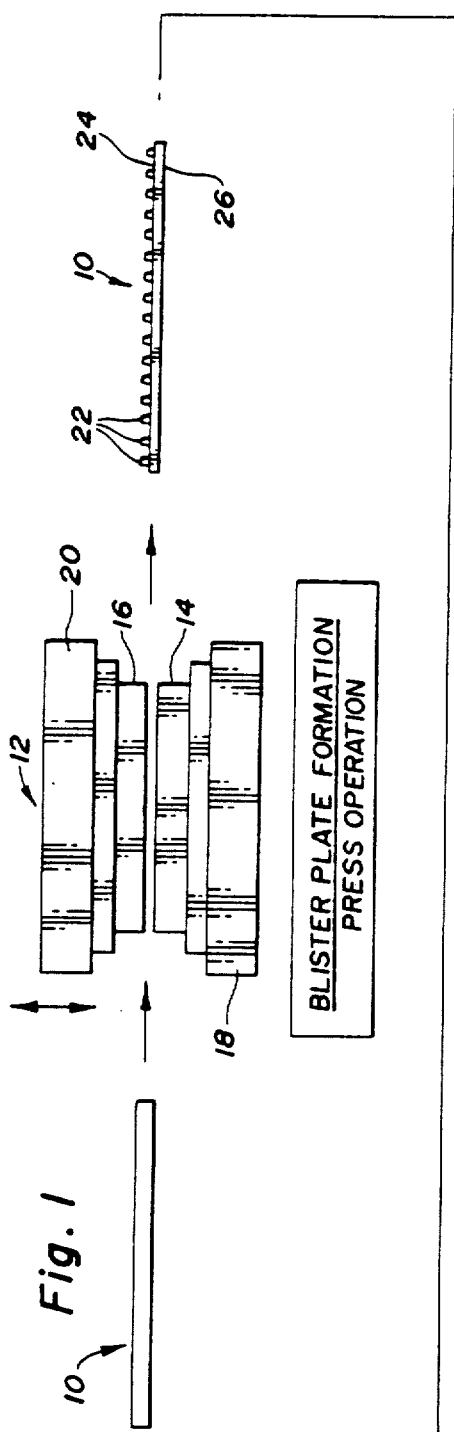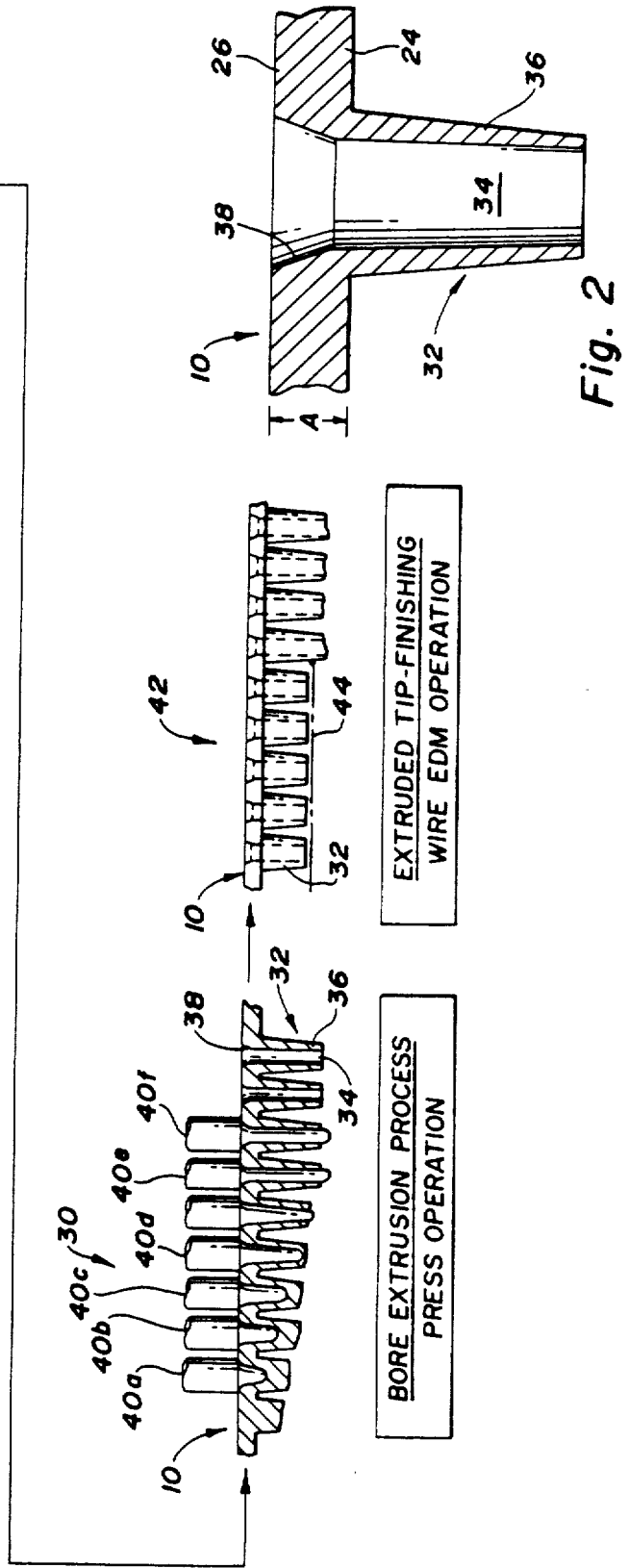

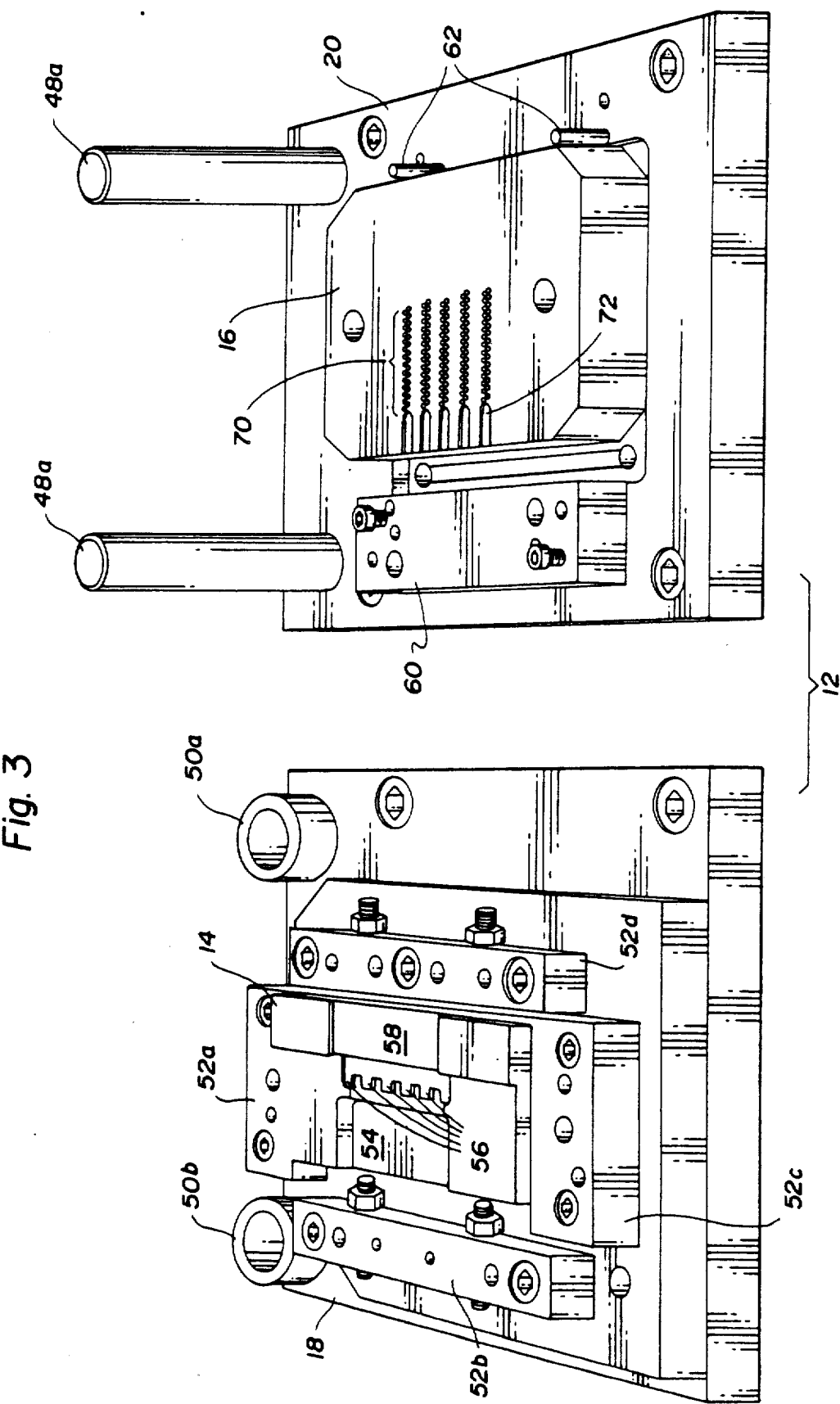

METHOD OF FORMING BUSHING PLATE FOR GLASS FILAMENTS

FIELD OF THE INVENTION

This invention relates to bushing plates used in the production of glass fibers, and to a method and related apparatus for forming such plates.

BACKGROUND ART

Glass fibers are produced by the attenuation of molten glass issuing from nozzles under the influence of gravity. The nozzles are normally contained in an array on a bushing plate.

A bushing plate is normally fabricated of a precious metal alloy, nominally 80% platinum and 20% rhodium, to be able to withstand the extremely high processing temperatures of glass and the presence of corrosive agents in the bushing environment. A bushing plate has a limited service life, and must be repaired or reclaimed for re-use of the precious metal alloy.

The productivity or throughput of a bushing plate is a function of the number of nozzle tips contained in the array on the plate. The nozzle tips must be formed with uniform bore dimensions, wall thicknesses and heights to ensure uniformity in the diameter of the resultant glass fibers. The bushing plate through its high material cost, limited service life and accuracy requirements is a significant component of the cost of capital equipment used in glass fiber production. The objective of the present invention is, therefore, to provide a bushing plate which can be produced by a high-quality, low-cost process, and contains a relatively dense packaging of nozzle tips on the plate to accord a high commercial production of glass fibers.

A summary of known techniques for forming bushing plates is given in K. L. Loewenstein, *The Manufacturing Technology Of Continuous Glass Fibers*, 2nd Ed., pages 131-35, Elsevier Science Publishers B.V., The Netherlands. However, bushing plates made in accordance with the method of embossing one side of a sheet of material and cold forming the formed boss into a nozzle tip extending from the said one side results in a layered, high stress fillet where the nozzle is contiguous with the surface.

DISCLOSURE OF THE INVENTION

The present invention provides a method for low-cost, high-quality manufacture of bushing plates with relatively dense nozzle packaging.

The method involves an initial cold forming press operation on a starting plate of precious metal alloy to coin embossments (or "blisters") from one surface of the plate. The embossments are coined by progressive feeding of the plate through a die tool having upper and lower halves. The upper half die tool causes material to cold flow and form parallel, raised rows in the surface contacting the upper die tool half. The rows on the one surface are positioned and dimensioned to match the material quantity requirements for the embossments to be subsequently coined on the other surface of the plate.

The embossments are formed in a further stage of the cold forming press operation. More specifically, as the plate is progressively indexed through the station, the lower die tool is formed with progressively deepening cavities for the cold flow of material in the opposite direction into the embossments. The progressive cold flow of material in such opposite direction results in the elimination of the channels initially formed on the upper work surface.

The embossed plate is then subjected to a bore forming process which involves progressive cold forming of a bore through the embossment to define the nozzle tip. The bore extrusion process is implemented by progressive punching of the plate in the area of each embossment to draw the material into the shape of the nozzle tip and provide a central bore opening corresponding to the diameter of the glass fiber to be formed. This process results in the nozzles extending contiguously from the surface opposite said one surface of the plate. Thereby the nozzles have relatively stress free fillets where each nozzle is contiguous with the opposite surface. The problem of unbonded laminations of cold formed layers at the juncture of the nozzle tip base with the surface is minimized or avoided.

The bushing plate thus formed is then finished by trimming the nozzle tips to their desired height. The trimming may be implemented by an electrical discharge machining (EDM) wire finishing operation. The finished plate is then annealed in a conventional manner.

The features and advantages of the present invention are readily apparent from the following detailed description of the best mode for carrying out the invention when taken in connection with the accompanying drawings.

BRIEF DESCRIPTION OF THE DRAWING

FIG. 1 is a schematic and diagrammatic flow diagram of the process and equipment involved in forming a bushing plate according to the method and apparatus of the present invention;

FIG. 2 is an enlarged cross-sectional view of a finished nozzle tip;

FIG. 3 is a developed view of the die tool used to form embossments in the "Blister Plate Formation" stage of FIG. 1;

BEST MODE FOR CARRYING OUT THE INVENTION

Figure 4:
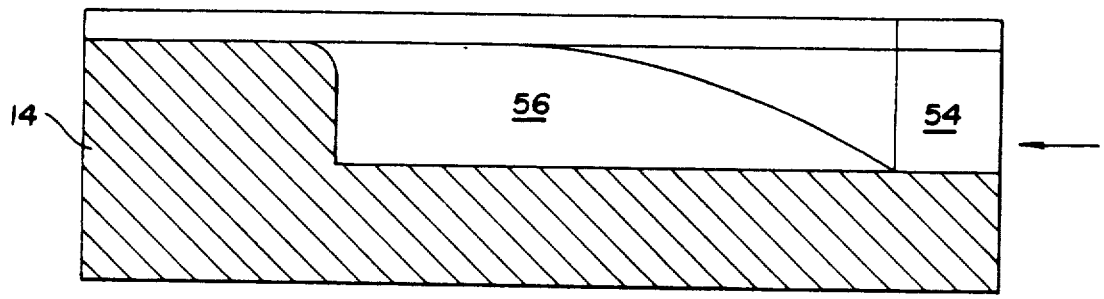
FIG. 4 is a cross-sectional view of a portion of the die tool shown on the left side of FIG. 3.

FIG. 1 illustrates schematically and diagrammatically the method and equipment involved in the present invention. The process is started by selection of a plate 10 as a work piece for formation of a finished bushing plate. The plate 10 is normally comprised of a precious metal alloy, and has a thickness nominally twice that of the finished base plate.

The plate 10 is fed to a press station, indicated generally at 12, for coining of "blisters," which are embossments raised from one surface of the plate. The press station 12 is shown schematically as having a die tool having lower and upper halves 14 and 16. The lower die tool half 14 is affixed to a lower platen 18, and the upper die tool 16 is affixed to a like platen 20. The press station 12 is hydraulically operated in conventional manner, and may be operated with 140-150 tons of forming force.

The plate 10 is fed through the press station 12 by indexing it forward one blister position at a time. In a practical embodiment the blisters are positioned 0.176 inch on center along the direction of feed.

The plate 10 emerges from the press station 12 with an array of embossments or blisters 22 coined on one surface 24. The opposite surface 26 of the plate 10 is continuous. However, as will be discussed in connection with the detail of the die tool 14, the surface 26 has transitional channels cold formed as an intermediate step of flowing material into position for upsetting the embossments 22 from the surface 24.

An advantage of cold flowing metal through the plane of the plate 10 to form the blisters 22 on the opposite surface is that the base of each blister does not have a concentration of microscopic stresses caused by unbonded laminations of folded metal. This problem results from blister forming techniques where the blister is formed by causing metal to cold flow over itself resulting in unbonded laminations. When the bushing plate is used in its normal environment, the surface from which the nozzle tips project is in tension, and the plate is subjected to extremely high operating temperatures. The microscopic stresses which result from unbonded laminations can shorten the useful life of the bushing plate, or cause mechanical fractures or faults, or other problems.

With continuing reference to FIG. 1, the plate 10 with the preformed embossments 22 is fed to a second press station, indicated generally at 30, for a bore extrusion process. In such process a group of punches 40 $a$-$f$ progressively draw the embossments to the shape of the finished nozzle tip and form central longitudinal bores. More specifically, it can be seen that each of the punches 40$a$-$f$ has a deeper or wider penetration, or both, to progressively form the nozzle tip and bore. Because of work hardening of metal, it is recommended that the bore hole expansion be limited to 20% or less at each stage.

The resultant tip body is indicated at 32, and includes an extruded wall 36 of generally frusto-conical shape, a central longitudinal bore 34 for issuance of molten glass, and a counter-sunk opening 38 to facilitate entry of molten glass into the nozzle.

The tips of the nozzle 32 are then finished by trimming them to a predetermined, uniform height. In the preferred embodiment the finishing is performed by a wire electrical discharge machining (EDM) operation. In practice, this involves securing the plate in a fixture and trimming the tips with an EDM wire, of about 0.008 inch, to yield tip ends free of burrs or mechanical abrasion. The finishing is obtained through electrical oxidation of the metal as it contacts the EDM wire. The value of the platinum-rhodium metal alloy may warrant recovery of the scrap from the EDM wire operation by use of a water recovery centrifuge or like type device. It is to be understood that the finished plate is then annealed in a conventional manner.

FIG. 2 is an enlarged, cross-sectional view of a finished nozzle tip formed from the plate 10. The resultant thickness A of the plate 10 is about one-half of the nominal starting thickness of the plate before entering the first press station 12. The upper surface 26 of the plate 10 is relatively smooth and continuous. The lower surface 24 has the array of nozzle tips 32 raised therefrom. Each nozzle tip 32 includes a wall of frusto-conical shape, the center bore 34, and a counter-sunk opening 38.

FIG. 3 is a developed view of a practical embodiment of the die tool halves 14 and 16 employed in the first press station 12.

The die tool half 14 is mounted on its platen 18 by a set of fixture blocks 52$a$-$d$. Similarly, the die tool half 16 is mounted on its platen 20 with comparable fixture block 60 and locating pins 62. The die tool halves 14 and 16 are held in registering relation by guides 48$a$ and $b$ which are received for sliding movement within their corresponding bushings 50$a$ and $b$.

The function of the die tool half 14 (at left in FIG. 3) is to preform transitional channels on one surface (e.g. surface 26 in FIG. 1) of the plate 10. The transitional channels are formed by cold flowing metal into alternating parallel grooves and rows matching the linear alignment of the embossments to be upset from the opposite surface of the plate.

For this purpose, the plate is received by the tool half 14 in a recess 54. As the plate is progressively indexed through the station it encounters a plurality of spaced ramp fingers 56. The side profile of a ramp finger 56 is shown in FIG. 4, and it can be seen that as the plate 10 is progressively fed in the direction of the arrow, the ramp finger forms channels or grooves in the contacting surface of the plate. The hydraulic clamp force applied to the platens 18 and 20 causes the material in the plate to flow into the cavities between each of the fingers and form raised rows of material.

Figure 6:
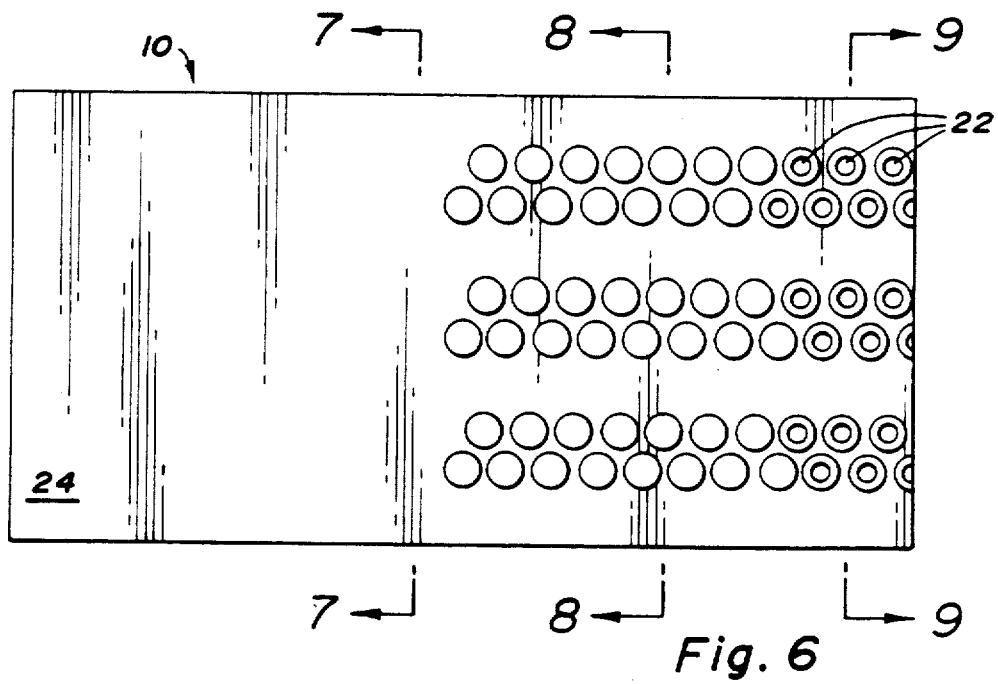
FIG. 6 is a plan view of a plate as work-in-process through the Blister Plate Formation stage of FIG. 1.
Figure 7:
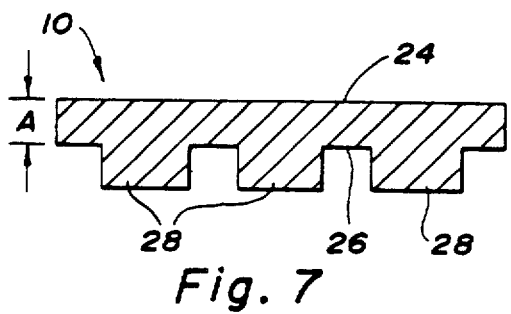
FIG. 7 is a cross-sectional view taken along line 7—7 of FIG. 6.

FIGS. 6 and 7 serve to illustrate the formation of the transitional channels on the surface of the plate contacting die tool half 14. In particular, FIG. 6 is a plan view of work-in-process through the press station 12, and FIG. 7 is a cross-sectional view taken at mid-position of the plate 10 just prior to initial upsetting of the blisters. FIG. 7 shows the channels formed as a result of the cold flow of material between the spaced fingers 56 contacting the surface 26 of the plate 10. Moreover, the plate thickness A is reduced to about one-half of the starting thickness of the plate.

Again with reference to FIG. 3, the die fingers 56 are followed by a planar clamping surface 58 which assists in the flow of material in the opposite direction to upset the blisters on the opposite surface of the plate 10.

The other die tool half 16 serves to upset the blisters or embossments 22 from the surface 24 of the plate 10. The arrow shows the direction of feed over the work surface of the die tool half 16.

The work surface of the die tool half 16 is characterized by a plurality of parallel blister forming cavities 70 followed by wells 72. As the plate 10 is indexed through the press station 12, the blisters are formed by flow of material from the surface 24 into the progressively deeper cavities 70 under influence of the hydraulic clamping force.

Figure 5:
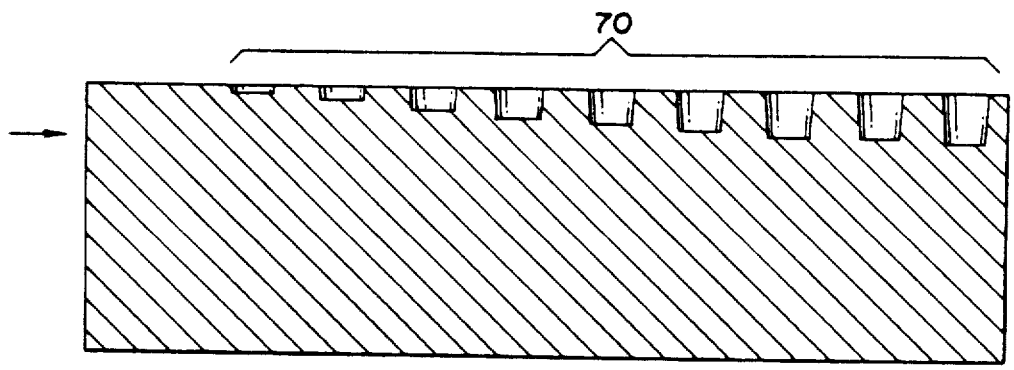
FIG. 5 is a cross-sectional view of a portion of the die tool shown in the right side of FIG. 3.

FIG. 5 is a schematic cross-sectional elevational view of the cavities 70 which shows their progressive deepening. The right-most cavity is dimensioned to match the final shape and geometry of the blisters 22 to be upset from the surface 24 of plate 10.

Figure 8:
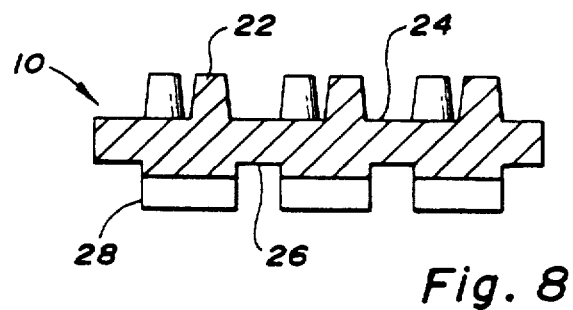
FIG. 8 is a cross-sectional view taken along line 8—8 of FIG. 6.
Figure 9:
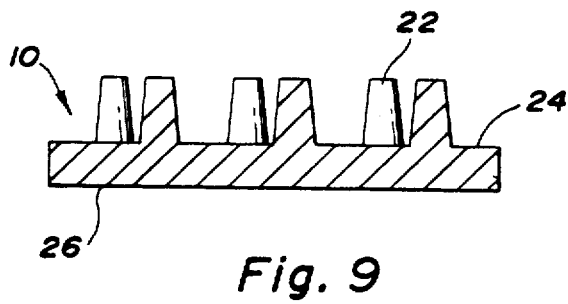
FIG. 9 is a cross-sectional view taken along line 9—9 of FIG. 6.

FIGS. 8 and 9 show schematically the partial and final forming, respectively, of the blisters 22. In FIG. 8 the blister 22 is partially raised from the surface 24, and the raised rows shown in section immediately below the blisters are drawn down as material flows from the rows into the blister cavities 70 in the die tool half 16.

FIG. 9 is a sectional view taken proximate the lead end of plate 10 in FIG. 6 and shows mature blisters 22 upset from the surface 24. Also, at this stage, the channels and rows have been eliminated on the opposite surface 26 through the course of blister formation.

The further method steps of nozzle tip formation through the bore extrusion process, and the tip finishing through a wire EDM operation, have previously been described in connection with the discussion of FIG. 1.

The invention thus described yields a high-quality, low-cost process and apparatus for forming bushing plates with relatively high density packaging of nozzle tips for enhanced productivity. The invention has been described in reference to a specific embodiment, and it is to be understood that modifications or variations of the present invention may be realized by those of skill in the art without departing from the scope of the following claims.

The embodiments of the invention in which an exclusive property or privilege is claimed are defined as follows:

1. A method for forming a bushing plate having an array of nozzle tips comprising the steps of:

providing a starting plate of predetermined material content and thickness sufficient to form the bushing plate;

feeding the starting plate through a cold forming station in progressive steps wherein each step involves coining one or more rows of material raised from one surface of the plate at a leading feed position, and coining embossments on the other surface of the plate at locations corresponding to the nozzle tips at a trailing feed position;

feeding the plate in steps through a punching station to form the bodies of the nozzle tips by progressive punching of the embossments; and finishing the nozzle tip ends.

2. The method of claim 1 wherein the rows of material raised from the one surface are aligned with the embossments to be coined on the other surface.

3. The method of claim 1 wherein the starting plate has a predetermined thickness approximately twice the thickness of the finished bushing plate.

4. The method of claim 1 wherein the step of finishing the nozzle tip ends includes EDM wire finishing the tip ends to a uniform height.

5. The method of claim 1 wherein the step of forming the bodies of the nozzle tip involves progressive punching of a plurality of embossments during each feed step.

* * * * *